Feb. 11, 1936.     W. A. HARRISON     2,030,368
WIRELESS CORN PLANTER
Filed Aug. 19, 1935     3 Sheets-Sheet 2
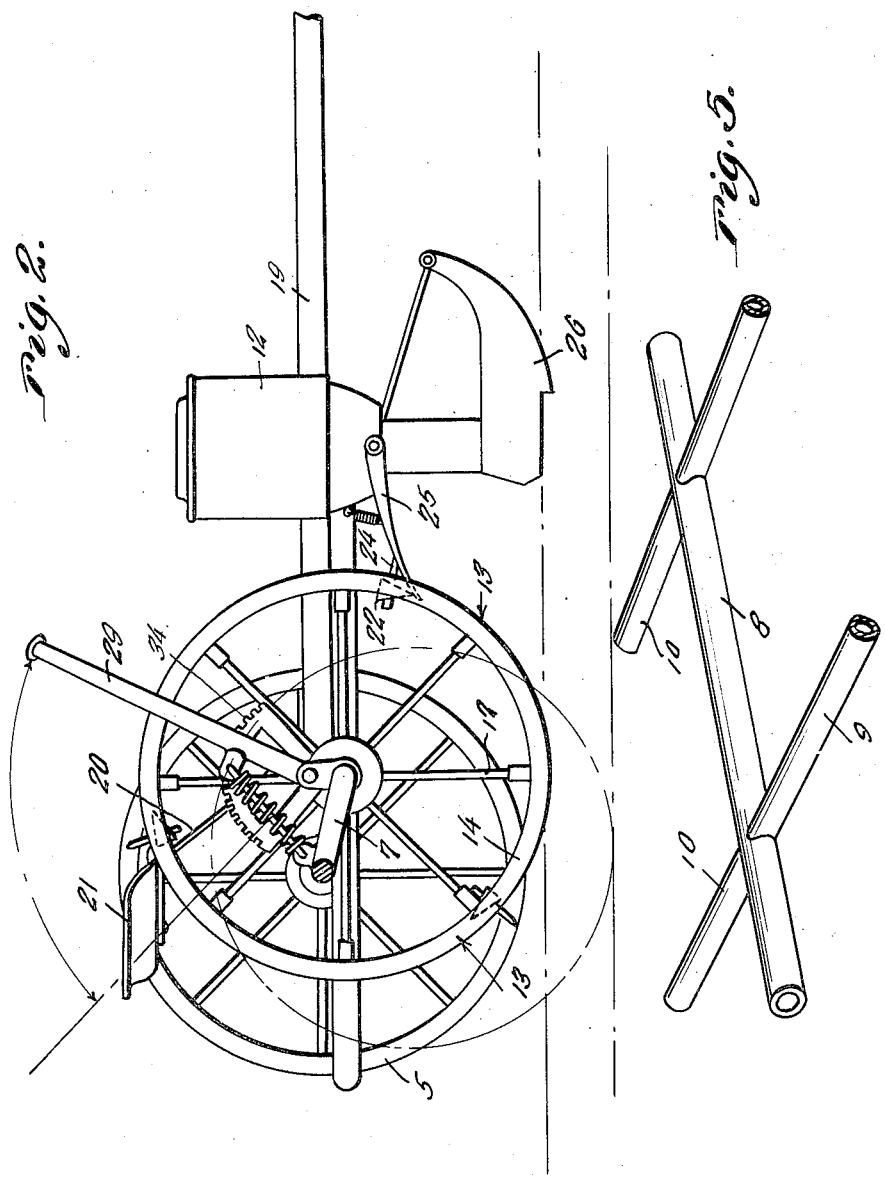
Inventor
*W. A. Harrison*
By *Clarence A. O'Brien*
Attorney

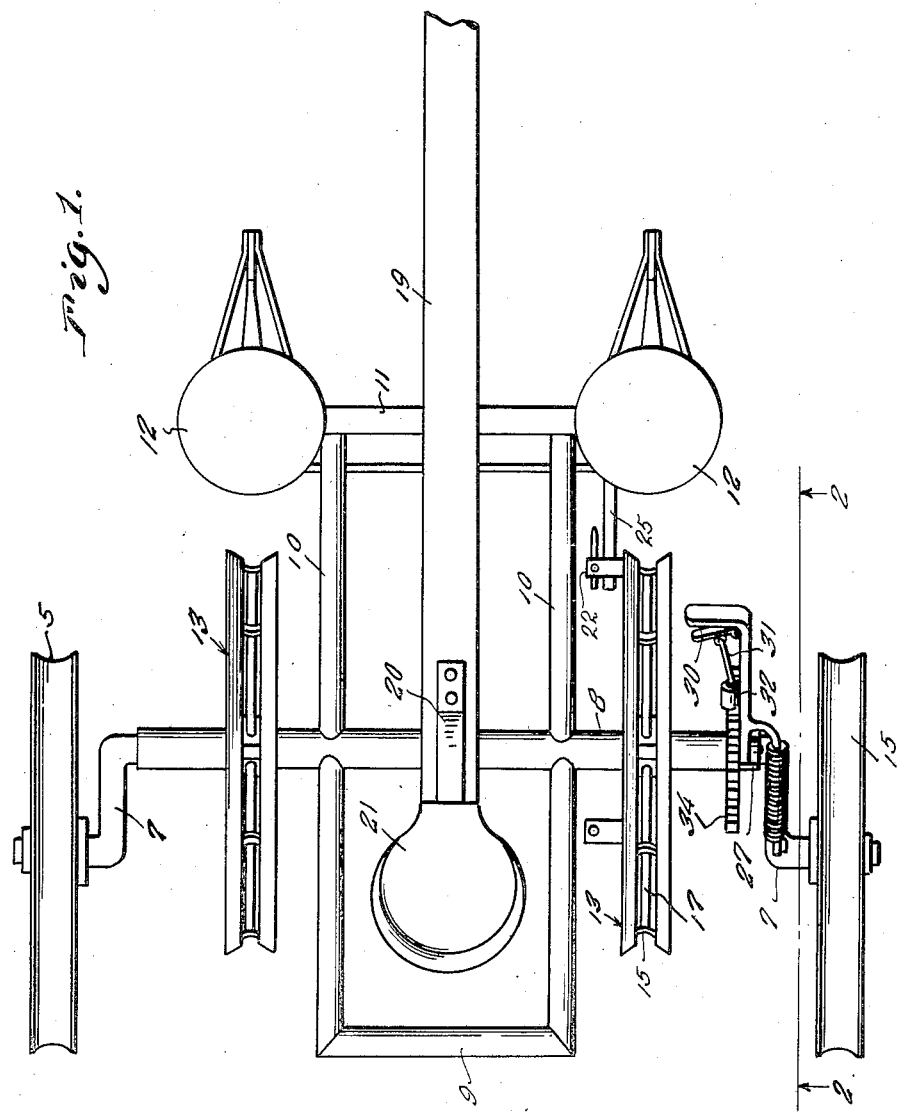

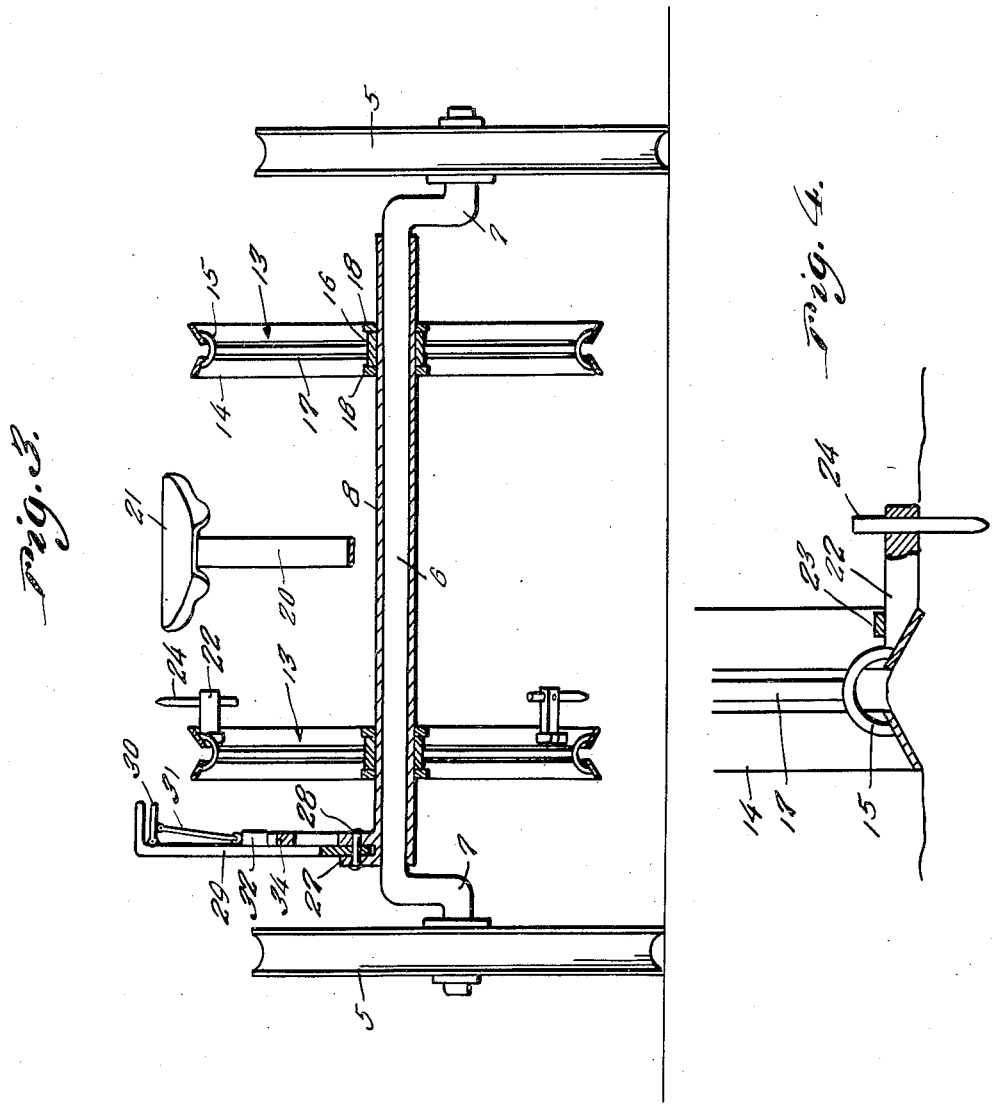

Patented Feb. 11, 1936

2,030,368

UNITED STATES PATENT OFFICE 2,030,368

WIRELESS CORN PLANTER

Wilber A. Harrison, Danville, Ill.

Application August 19, 1935, Serial No. 36,916

2 Claims. (Cl. 111—23)

This invention appertains to new and useful improvements in planting mechanism and the principal object of the invention is to provide a machine which eliminates the usual wire heretofore required in accurate placing.

The principal object of the present invention is to provide a machine wherein the traction of the machine serves to dispense the seed and mark the rows.

Another important object of the invention is to provide a planter which can be constructed and sold cheaply and which will be more easily operated to the end that more corn can be planted in a less period of time and just as efficiently as with the wire guided type of machine now in general use.

Other important objects and advantages of the invention will become apparent to the reader of the following specification.

In the drawings

Figure 1 represents a top plan view of a machine of the two row type.

Figure 2 represents a sectional view taken substantially on line 2—2 of Figure 1.

Figure 3 represents a vertical sectional view through the machine.

Figure 4 represents a fragmentary detailed sectional view through one of the strip and marker wheels.

Figure 5 represents a fragmentary perspective view of the frame construction.

Referring to the drawings wherein like numerals designate like forms, it can be seen that the planter consists in the construction of the usual pair of grooved traction wheels 5—5, while numeral 6 represents the elongated axle provided with the cranks 7 at the ends thereof for supporting the wheels 5—5.

Numeral 8 represents an elongated tube through which the axle 6 extends. Rearwardly of this tube 8 is the U-shaped frame extension 9 and forwardly thereof are the extensions 10—10 for supporting the cross member 11 on which the seed boxes 12—12 are supported.

A pair of wheels each generally referred to by numeral 13 are rotatably supported on the tube 8. These wheels 13 each consists of a pair of bands 14 angularly set with respect to each other to provide V-shaped traction surfaces such as the wheels 5 possess, these bands 14 being connected together by straps 15. Each of the wheels 13 is provided with a hub 16 which is connected to the said straps 15 by suitable spokes 17. Collars 18—18 are provided on the tube 8 for each of the wheels 13 to prevent longitudinal shifting of the wheels on the tube 8, although allowing the wheels 13 to freely rotate on the tube 8.

Numeral 19 represents a draft tongue which extends rearwardly to a point on the axle 6 where the leaf spring 20 rises and supports the operator's seat 21. At suitable spaced intervals on one of the bands 14 of one of the wheels 13 a block 22 is clamped in place as at 23 so as to project laterally and this block or lug is provided with a pin 24 extending therethrough in a direction radially and outwardly with respect to the corresponding band 14.

Referring now to Figure 2, it can be seen that numeral 25 represents the trip lever of the seed boxes 12 while numeral 26 represents the usual runner shoe of the seed dispenser. This lever 25 projects into the path of the lugs 22, so that when the wheels 13 are in lowered position and are riding along the ground, the lugs successively engage the lever 25 and trip the dispensing mechanism so that the seeds are dropped at regular intervals and where these seeds are dropped their location is marked as the pin 24 penetrates the ground. Thus a line of perforations is left along the ground defining where the last row of corn was planted.

To permit lowering and elevating of the wheels 13, a bifurcated formation 27 is provided on one end of the tube 8 through which a pivot pin 28 extends to swingably mount the hand lever 29. This hand lever 29 is provided with the hand grip 30 from which the link 31 extends to the detent 32 which is engageable with the rack 34 carried by the tube 8. Thus it can be seen, when the detent 32 is released, the axle 6 is free to swing so as to lower the wheels 13 to ground engaging position so that as they rotate the lugs 22 will successively engage the dispensing lever 25 in the manner substantially explained above.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A planter comprising an axle provided with cranks at the ends thereof, traction wheels on the said cranks, a tube through which the axle extends, a frame carried by the tube, a seed planting mechanism supported by the frame and including a lever for tripping the said mechanism, a freely rotatable wheel carried by the tube and provided with a laterally disposed lug for engaging the dispensing mechanism lever when the last mentioned wheel is in ground engaging position, means whereby the said axle can be swung so as to lower the tube and the wheel thereon so that the said last mentioned wheel will engage the ground and rotate coincidentally with the rotation of the traction wheel.

2. A planter comprising an axle provided with cranks at the ends thereof, traction wheels on the said cranks, a tube through which the axle extends, a frame carried by the tube, a seed planting mechanism supported by the frame and including a lever for tripping the said mechanism, a freely rotatable wheel carried by the tube and provided with a laterally disposed lug for engaging the dispensing mechanism lever when the last mentioned wheel is in ground engaging position, means whereby the said axle can be swung so as to lower the tube and the wheel thereon so that the said last mentioned wheel will engage the ground and rotate coincidentally with the rotation of the traction wheel, and a pin on each of the lugs projecting beyond the periphery of the wheel carrying the said lugs so as to mark the ground to denote a planted row.

WILBER A. HARRISON.